United States Patent
Feng et al.

(10) Patent No.: US 7,352,373 B2
(45) Date of Patent: Apr. 1, 2008

(54) SYSTEMS AND METHODS FOR MULTI-DIMENSIONAL DITHER STRUCTURE CREATION AND APPLICATION

(75) Inventors: Xiao-Fan Feng, Vancouver, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 989 days.

(21) Appl. No.: 10/676,891

(22) Filed: Sep. 30, 2003

(65) Prior Publication Data

US 2005/0068463 A1   Mar. 31, 2005

(51) Int. Cl.
*G09G 5/02* (2006.01)
(52) U.S. Cl. .................. 345/596; 345/597; 345/611
(58) Field of Classification Search ........... 345/596, 345/597, 611
See application file for complete search history.

(56) References Cited

U.S. PATENT DOCUMENTS

| | | | | |
|---|---|---|---|---|
| 4,675,532 | A * | 6/1987 | Carson | 348/294 |
| 5,111,310 | A * | 5/1992 | Parker et al. | 358/3.19 |
| 5,164,717 | A * | 11/1992 | Wells et al. | 345/596 |
| 5,201,030 | A * | 4/1993 | Carrie | 345/596 |
| 5,469,515 | A * | 11/1995 | Lin | 382/237 |
| 5,473,384 | A * | 12/1995 | Jayant et al. | 348/470 |
| 5,633,958 | A * | 5/1997 | Kato | 382/302 |
| 6,028,608 | A * | 2/2000 | Jenkins | 345/619 |
| 6,091,849 | A * | 7/2000 | Spaulding et al. | 382/162 |
| 6,147,671 | A * | 11/2000 | Agarwal | 345/691 |
| 6,281,942 | B1 * | 8/2001 | Wang | 348/607 |
| 6,476,824 | B1 * | 11/2002 | Suzuki et al. | 345/690 |
| 6,483,928 | B1 * | 11/2002 | Bagni et al. | 382/107 |
| 6,573,928 | B1 * | 6/2003 | Jones et al. | 348/51 |
| 6,697,109 | B1 * | 2/2004 | Daly | 348/268 |
| 6,795,085 | B1 * | 9/2004 | Doherty et al. | 345/596 |
| 6,859,275 | B2 * | 2/2005 | Fateley et al. | 356/330 |
| 6,950,211 | B2 * | 9/2005 | Trifonov et al. | 358/3.26 |
| 6,993,535 | B2 * | 1/2006 | Bolle et al. | 707/104.1 |
| 7,006,680 | B2 * | 2/2006 | Gulati | 382/133 |
| 7,098,927 | B2 * | 8/2006 | Daly et al. | 345/596 |
| 7,167,574 | B2 * | 1/2007 | Kim | 382/100 |
| 7,190,380 | B2 * | 3/2007 | Damera-Venkata et al. | 345/698 |
| 7,268,790 | B1 * | 9/2007 | Small et al. | 345/596 |
| 2002/0057431 | A1 * | 5/2002 | Fateley et al. | 356/330 |
| 2002/0069218 | A1 * | 6/2002 | Sull et al. | 707/501.1 |
| 2002/0094130 | A1 * | 7/2002 | Bruls et al. | 382/261 |
| 2002/0168017 | A1 * | 11/2002 | Berthet et al. | 375/267 |
| 2003/0033347 | A1 * | 2/2003 | Bolle et al. | 709/107 |
| 2003/0062422 | A1 * | 4/2003 | Fateley et al. | 235/494 |
| 2003/0088401 | A1 * | 5/2003 | Terez | 704/207 |

(Continued)

OTHER PUBLICATIONS

Approximate spatio-temporal retrieval Dimitris Papadias, Nikos Mamoulis, Vasilis Delis Jan. 2001 ACM Transactions on Information Systems (TOIS), vol. 19 Issue 1 Publisher: ACM Press.*

(Continued)

*Primary Examiner*—Kee M. Tung
*Assistant Examiner*—Javid A Amini
(74) *Attorney, Agent, or Firm*—Krieger Intellectual Property, Inc; Scott C. Krieger

(57) ABSTRACT

Embodiments of the present invention comprise systems and methods for creation, modification and implementation of dither pattern structures.

17 Claims, 8 Drawing Sheets

U.S. PATENT DOCUMENTS

| | | | |
|---|---|---|---|
| 2003/0103058 A1* | 6/2003 | Elliott et al. | 345/589 |
| 2003/0164961 A1* | 9/2003 | Daly | 358/1.9 |
| 2003/0185450 A1* | 10/2003 | Garakani et al. | 382/232 |
| 2004/0017507 A1* | 1/2004 | Clayton | 348/407.1 |
| 2004/0165115 A9* | 8/2004 | Daly | 348/624 |
| 2004/0252230 A1* | 12/2004 | Winder | 348/402.1 |
| 2004/0252759 A1* | 12/2004 | Winder et al. | 375/240.12 |
| 2005/0068463 A1* | 3/2005 | Feng et al. | 348/574 |
| 2005/0069209 A1* | 3/2005 | Damera-Venkata et al. | 382/204 |
| 2005/0185001 A1* | 8/2005 | Feng et al. | 345/597 |
| 2005/0270584 A1* | 12/2005 | Trifonov et al. | 358/3.26 |

OTHER PUBLICATIONS

Vector field visualization: Case study: visualizing ocean currents with color and dithering Patricia Crossno, Edward Angel, David Munich Oct. 2001 Proceedings of the IEEE 2001 symposium on parallel and large-data visualization and graphics PVG '01 Publisher: IEEE Press.*

Parallel digital halftoning by error-diffusion Panagiotis Takis Metaxas Jun. 2003 Proceedings of the Paris C. Kanellakis memorial workshop on Principles of computing & knowledge: Paris C. Kanellakis memorial workshop on the occasion of his 50th birthday PCK50 Publisher: ACM Press.*

* cited by examiner

SYSTEMS AND METHODS FOR MULTI-DIMENSIONAL DITHER STRUCTURE CREATION AND APPLICATION

BACKGROUND

Digital images are communicated by values that represent the luminance and chromatic attributes of an image at an array of locations throughout the image. Each value is represented by a given number of bits. When bandwidth, storage and display requirements are not restrictive, sufficient bits are available that the image can be displayed with virtually uninhibited visual clarity and realistic color reproduction. However, when bit-depth is restricted, the gradations between adjacent luminance or color levels can become perceptible and even annoying to a human observer. This effect is apparent in contouring artifacts visible in images with low bit-depth. Contour lines appear in low frequency areas with slowly varying luminance where pixel values are forced to one side or the other of a coarse gradation step.

These contouring artifacts can be "broken up" by adding noise or other dither patterns to the image, generally before quantization or other bit-depth reduction. This noise or pattern addition forces a random, pseudo-random or other variation in pixel values that reduces the occurrence and visibility of contours. Typically, the image is perceived as more natural and pleasing to a human observer.

Some of these methods can be explained with reference to FIG. 1, which illustrates an image display system 1. In these systems, noise or dither patterns 16 can be added to 4 or otherwise combined with an image 2. The combined image is then quantized 6 to a lower bit-depth. The image may then be displayed directly or, as shown in FIG. 1, may be transmitted 8 to a receiver 10. After reception, the noise/dither 16 that was added to the image may be subtracted 12 or otherwise de-combined with the image to reduce the visible effect of the noise/dither on areas where contouring is not likely to occur. The image is then displayed 14 on the receiving end. These methods may also be used in systems that do not transmit or receive such as with displays with bit-depth capabilities that are lower than the image data 2 to be displayed.

Some of these methods may be explained with reference to FIG. 2. In these systems 20, an image 2 is combined 28 with a noise/dither pattern 16 and sent to a display system 22 that cannot display the full range of image data contained in the image. These display systems 22 may quantize 24 the image data to a bit-depth that matches the display capabilities. The quantized image data is then displayed on the display 26.

In the systems illustrated in FIG. 2, the noise/dither pattern is not subtracted or de-combined from the image. In these systems, less noise can be added to an image before it causes adverse visual impact or "graininess." Various frequency distributions for noise/dither patterns have been found to be more or less visible to the human visual system. Generally, the human visual system works as a low-pass filter that filters out high frequency data. Therefore, noise concentrated in a high-frequency range is less visible than lower frequency noise.

Often it is not feasible to use a dither/noise pattern that is as big as an image file. In these cases, a smaller dither pattern can be used by repeating the pattern across the image in rows and columns. This process is often referred to as tiling. In multiple image sets, such as the frames or fields of video images, a dither pattern may be repeated from frame to frame as well. Dither patterns may be designed to minimize artifacts created by their repetitive patterns.

Dither structures may comprise multiple dither patterns to be used across a single image of multiple frames. A three-dimensional dither structure, as shown in FIG. 3, may employ a series of dither patterns. These patterns 30-36 may be arranged in a sequence that is used on sequential frames of video. A first dither pattern tile 30 may be used on a first video frame 38 while a next sequential pattern 32 is used on a next successive video frame 40. The sequence of patterns 30-36 may be repeated after each pattern in the sequence is used. These sequences may also be specially designed to reduce the occurrence of artifacts from their repetitive temporal patterns.

SUMMARY

Systems and methods of embodiments of the present invention comprise the creation and/or application of dither structures. These structures may be used to reduce the visibility of contouring and other artifacts in still and video images.

BRIEF DESCRIPTION OF THE DRAWINGS

The following drawings depict only typical embodiments of the present invention and are not therefore to be considered to be limiting of its scope, the invention will be described and explained with additional specificity and detail through the use of the accompanying drawings in which.

DETAILED DESCRIPTION

Embodiments of the present invention may be used in conjunction with displays and, in some embodiments, in display algorithms that employ properties of the visual system in their optimization. Some embodiments of the present invention may comprise methods that attempt to prevent the contouring artifacts in displays that have too few gray levels. Some of these displays include LCD or similar displays with a digital bit-depth bottleneck. They may also be used with graphics controller cards with limited video RAM (VRAM). These bit-depth limitations can arise in the LCD display itself, or its internal hardware driver.

Some embodiments of the present invention include systems and methods comprising an anti-correlated spatio-temporal dither pattern, which exhibits high-pass characteristics in the spatial and temporal domains. Methods for creating these patterns comprise generation of a series of dither tiles for multiple image characteristic channels and the temporal domain.

Figure 4:
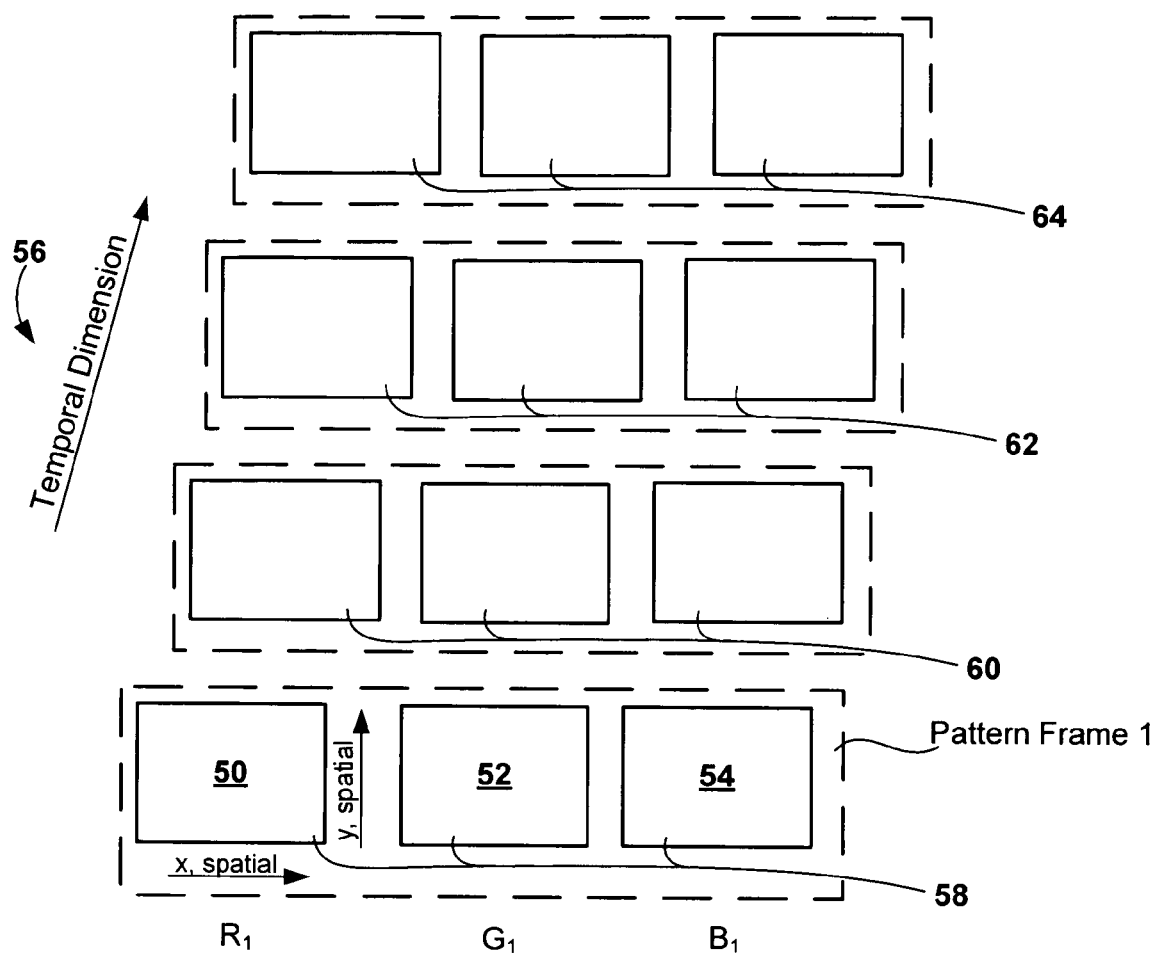
FIG. 4 illustrates a multi-dimensional dither structure with multiple image characteristic channels.

In a non-limiting example, as shown in FIG. 4, a different dither pattern tile 50, 52 & 54 may be generated for each of three RGB color channels and this set of three tiles 58 may be generated for a series of temporal frames 58, 60, 62 & 64. In this example, a multi-dimensional array of tiles is generated. In other embodiments, varying numbers of chrominance and luminance channels may be used and varying patterns may be used in successive frames in the temporal domain also.

Figure 5:
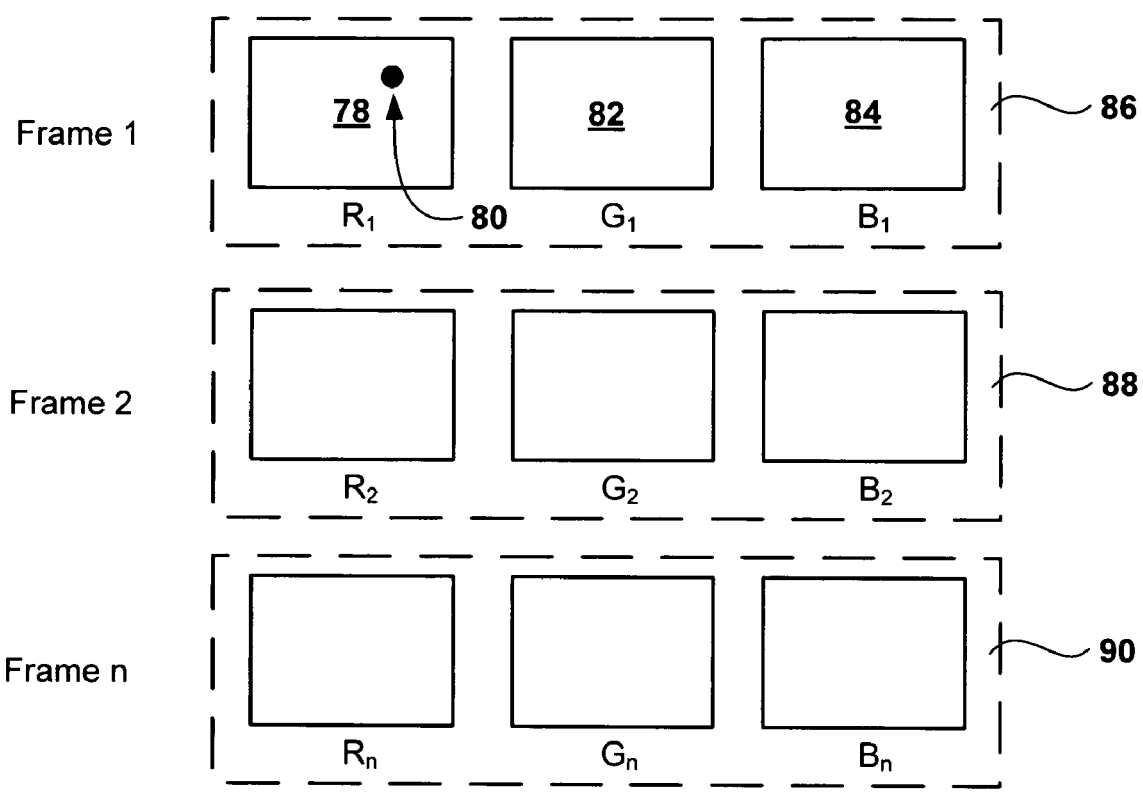
FIG. 5 a multi-dimensional dither structure with multiple image characteristic channels.

In some embodiments of the present invention, as illustrated in FIG. 5, a set of dither pattern tiles is generated one element at a time by successively designating or assigning each pixel value according to an anti-correlation or dispersion method, which may be referred to as a merit function. Using the merit function, pixel values in the dither pattern tiles can be generated. To ensure that the generated pattern is high-pass, a dispersion-related merit function is used to place each pixel.

In this exemplary method, a first pixel 80 is placed in the red channel tile 78 of frame 1. Since this is the first pixel the dispersion merit function may place the pixel value at essentially any location. This dispersion merit function can relate to values in the same color channel or a combination of color channels.

Once the first pixel has been placed, other pixels can be placed according to the dispersion merit function. These subsequent pixels will be placed in a manner that is dispersed from the first pixel 80. Generally, pixel values in the actual dither pattern 78 being developed will have greater weight than those in other channels, however these weighting factors may vary for specific applications. Each dither pattern tile (i.e., 78) can be completed individually or a set of tiles making up a frame may be generated simultaneously. For example, a pixel may be placed in a red channel tile 78 followed by a pixel placement in a green channel tile 82 of the same frame followed by a pixel placement in the blue channel tile 84 of the same frame. Alternatively, a single color channel tile may be completed before placement of pixel values in another color channel tile of the same frame.

In this manner, each frame's dither pattern tiles are generated with reference to the patterns already established in previous frames and currently developing frames. As the process continues from frame to frame, the weighting of previous frames may vary. For example, the weight given to pixel values in the closest preceding frame may be higher than that given to the next closest preceding frame Typically, due to memory constraints, the number of dither pattern frames is much less than the number of frames in a video clip so a series of pattern frames is reused in sequence. This cycle makes the first frame of the sequence 86 immediately follow the last frame 90. Accordingly, if these frames are not correlated, visible artifacts may develop. To avoid this, the last frames in a sequence are generated with reference to the first frame or frames as well as the previous frame or frames. This helps ensure that the pattern is continuously high-pass throughout multiple cycles.

In an exemplary embodiment of the present invention a 32×32 spatial dither pattern tile is generated for each color channel for RGB application. This pattern is created for 32 temporal frames thereby yielding a 32×32×32×3 array. The size is not a factor in the overall function of some embodiments and many different dimensions may be used. A merit function is used to disperse the pixel values into a high-pass relationship. This high-pass relationship may exist spatially within a dither pattern tile, spectrally across color channel tiles and temporally across successive frames. In order to achieve all these relationships, the location of a pattern pixel value must have feedback from other pixel values within the tile pattern, other color channel tiles within the frame and pixel values in adjacent frames. Dispersion or anti-correlation across color channels can help reduce fluctuation in luminance where human vision has the highest sensitivity.

Figure 6:
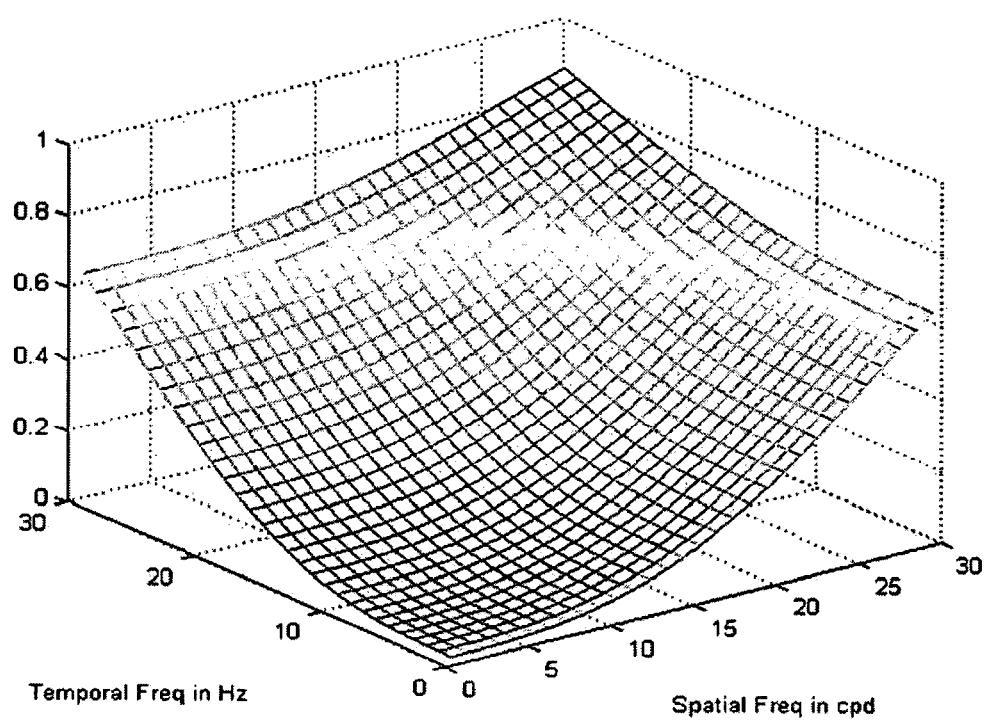
FIG. 6 illustrates a general high-pass spatial and high-pass temporal power spectrum.

FIG. 6 is a diagram showing a mutual high-pass temporal and spatial relationship achieved in some embodiments of the present invention. In order to achieve a high-pass pattern similar to that shown in FIG. 6 a variety of feedback functions and parameters may be used.

To define a dither pattern tile set several parameters must be defined. The spatial size of each tile (i.e., M×N), the number of frames, L and the number of color channels must be designated. Each parameter has trade offs that must be balanced. However, embodiments of the present invention allow less resource intensive parameters to be used without perceptible degradation of the final image. The number of levels in the dither pattern set must also be determined. A level may correspond to a luminance value, such as a gray-scale value in a monochrome image, a value for the luminance channel in image formats with specific luminance channels (i.e., LAB, LUV) and other parameters related to the visual perception of a pixel. This number may vary significantly according to specific application factors. In some embodiments, the number of levels may be determined with reference to the number of input bits and the number of output bits. In these embodiments, the number of levels may be determined by taking 2 to the power of the difference between the number of output bits and the number of input bits. In equation form this expression would be:

$$n=2^{(b_{in}-b_{out})}$$

For example, for an LCD display with the capability to display 6 bits, but receiving an input signal with 10 bits of data, the number of levels would be $$n=2^{(10-6)}=2^4=16.$$

When a display is linear, the dither values may be evenly distributed among each level. However, in many cases the display is not linear so the level distribution may be distributed in a non-linear manner. When the number of output bits is greater than 4 the non-linear effect is small so uniform distribution does not cause a large non-linear error. Accordingly, the number of pixel values may generally be distributed evenly among levels. However, for lower numbers of output bits and larger non-linearities (i.e., gamma >2) more threshold values should be distributed in the lower portion of the threshold range to compensate for the non-linear gamma effect.

Spatial/Temporal Repellent Function

Some embodiments of the present invention comprise a spatial/temporal merit function. This function serves to evenly distribute the dither values in the spatial/temporal dither space so that there is minimum fluctuation in both luminance and chrominance when viewed from a certain distance. In some of these embodiments, a model of a charged ball in the 3D space of the 3D dither pattern is used. In these methods, the process of assigning a dither value is equivalent to putting a charged ball at the corresponding location in 3D space. In effect, each ball repels other balls of the same charge as far as possible. The new ball (dither value) ends up in the least occupied space. In some of these embodiments we use the inverse-distance-squared function as the repellent function. This function is the same as that typically used to model the repellent force between charged particles of same charge. The distance can be normalized by the spatial resolution of the display in pixels per inch (PPI) and the temporal frame rate (fps). In some embodiments, the repellent function may be implemented with a convolution kernel as $$k(x, y, t) = 1 \Big/ \left( \frac{x^2 + y^2}{\sigma_s^2} + \frac{t^2}{\sigma_t^2} + 0.35 \right)$$

where x and y are the spatial coordinates, t is the temporal coordinate. The constant 0.35 may be used to prevent division by 0. This constant may also be used to adjust cross color channel influence. Other values may also be used for this constant. In these embodiments, a smaller constant will make it less likely that another color dither value will be assigned at this location due to the influence of a cross-color-channel repellent function. Sigma ($\sigma_s$) defines the spatial extent of the repellent function, which is a function of display resolution (PPI) and viewing distance. Sigma ($\sigma_t$) defines the temporal extent of the repellent function, which can be a function of the temporal frame rate.

In some embodiments of the present invention these parameters may be adjusted so that the power spectrum of the dither pattern is below the power spectrum of the equivalent noise of the human eye. In an exemplary embodiment, $\sigma_s$=2.5, and $\sigma_t$=1.2 are used for a display with a 100 dpi and 60 Hz frame rate.

Figure 7:
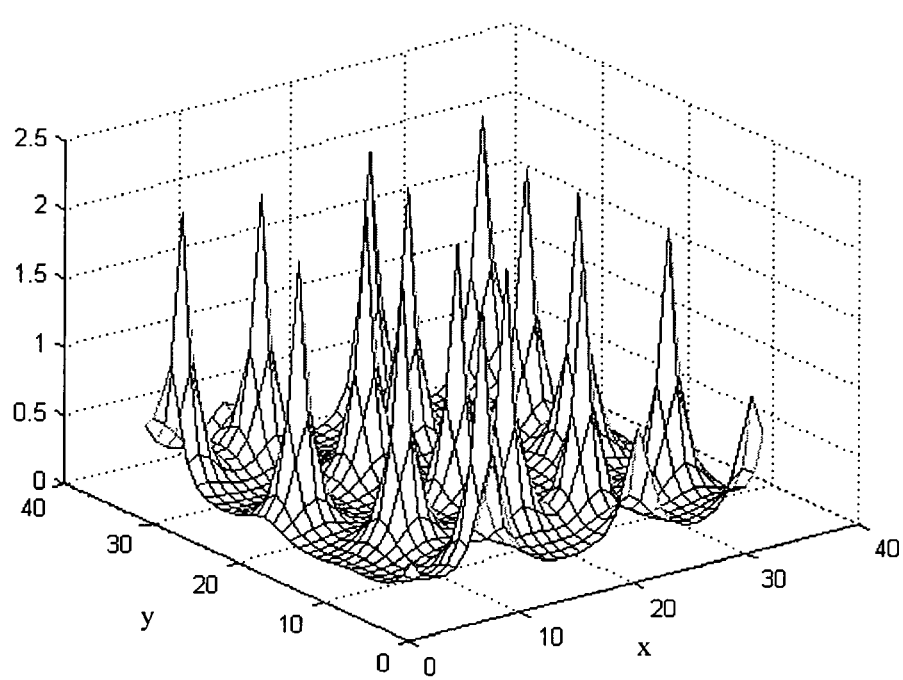
FIG. 7 illustrates a repellent function used in some embodiments of the present inventions.

The spatial/temporal repellent function may be described in equation form by $$R(x,y,t,\text{color})=img(x,y,t,\text{color})**k(x,y,t)$$

where img(x,y,t,color)=1 if that position is already assigned a dither value. To improve the speed, the convolution operation may be implemented as an addition of the shifted kernel in the 3D space $$R(x,y,t,\text{color})=R(x,y,t,\text{color})+k(x-x_0,y-y_0,t-t_0)$$

where $x_0$, $y_0$ and $t_0$ are the location of the new dither value position. Whenever a new dither value is assigned, repellent functions may be updated. Due to the limited size of the dither pattern, the shift operation can cause the kernel to extend beyond the size of the dither pattern. In this case, the kernel may be wrapped around the dither pattern when the kernel extends beyond the dither pattern, i.e $$f(z) = z - z_0 = \begin{vmatrix} z+N & \text{if } (z<0) \\ z-N & \text{if } (x \geq N) \end{vmatrix}$$

where z can be x, y, or t, and N is the size of pattern in z dimension. FIG. 7 depicts a typical repellent function of some embodiments of the present invention. The peaks are located at the position of dither values that are already assigned.

Cross Color Channel Repellent Function

Since the luminance sensitivity of human vision is more sensitive than chrominance sensitivity, it is important to optimize three color dither patterns so that the luminance fluctuation is minimized. As a non-limiting example, for a given gray, if the red dither value is assigned in a position, the green dither value should also be repelled by the red dither value. Cross channel repellent function may be implemented using a set of weighted repellent functions.

$$\begin{bmatrix} R'_r \\ R'_g \\ R'_b \end{bmatrix} = \begin{bmatrix} C_{rr} & C_{gr} & C_{br} \\ C_{rb} & C_{gg} & C_{bg} \\ C_{rb} & C_{gb} & C_{bb} \end{bmatrix} \times \begin{bmatrix} R_r \\ R_g \\ B_b \end{bmatrix}$$

where $C_{ij}$ is the weight of cross color channel repellent function. The apostrophe (') is used to denote the combined repellent function from all the color channels. Since the contribution to luminance is different for the three color channels, with green having the biggest contribution and blue having the least, we could optimize the weight so that $C_{gg}$ is higher than $C_{bb}$. In some embodiments, the inventors found this effect to be small thus only two weights were used in these embodiments: off-diagonal weight C1 and diagonal weight C2.

The cross channel weighting function may also be level dependent. In some embodiments, the weighting function may be defined as:

$$C1=((\text{level}-n\text{Levels}/2)/n\text{Levels})^2+0.07$$

$$C2=1-2*C1$$

At mid levels, C1 is the smallest so that the cross channel effect is very small, while at both low level and high level, the cross channel weighting function is larger.

Dither Value Assignment

In some embodiments, the combined repellent function (R') is used to determine the position of the next dither value for that color. It finds the position (I,j) of the minimum of the repellent function, i.e. the least occupied space, and sets the dither value to the level-1.

$$DA(I,j,t,\text{color})=\text{level-1}$$

If there is more than one position at which a minimum value occurs, the algorithm may randomly pick one from the many positions. Once a dither value is assigned, the repellent function may be updated to account for the new pixel value. This process is repeated for all the colors, pixels, levels, and frames, so that every element in the dither pattern is assigned.

Some embodiments of the present invention may be explained with reference to FIG. 7, which illustrates the steps of these methods 100 in flow chart form. In these embodiments, dither pattern parameters are designated 102 to define the characteristics and dimensions of the tile set. The steps of these methods may be ordered in many ways, however, in the exemplary embodiments illustrated in FIG. 8, each dither pattern frame is designated 104 before proceeding to the next frame. Once a frame has been initialized, these methods proceed to designate each level 106 of the dither pattern frame.

For each level, the cross color-channel-influence is evaluated 108. This influence may vary according to the level therefore it is typically calculated inside the level determination loop 106, however, in non-level-dependent embodiments, it may be calculated in another order. This cross-color-channel influence may also depend on other parameters in lieu of or in addition to level parameters.

The spatial and temporal dispersion or repulsion function is then constructed 110. A first pixel is then selected and a pixel counter is incremented 112 and a color channel tile is selected 114.

The effects of the cross-color-channel function and the spatial/temporal repellent function may then be combined 116 to provide a composite function for which maxima and minima may be determined. The minimum or maximum values of this combined function are then found 118 to determine the optimal or preferable pixel location. If multiple minima or maxima are found, a single value can be selected randomly or by some other process. Once this location is determined, a pixel value is assigned according to the current level.

The combined repellent function is then revised to reflect the presence of the newly designated pixel value 120. The process then jumps to the next color tile 122 in the frame and proceeds to designate a pixel value for that tile as explained for steps 112 through 120. Once all color tiles have a pixel designated, the pixel counter is incremented 124 and another pixel value is designated for each color tile as explained in steps 112 through 122. When all the pixels allocated for a specific level have been designated, the process jumps to the next level 126 and designates the pixel values for that level. This process continues until all pixels for each level of each color tile are designated. The process then advances to the next frame of the dither pattern array 128 and repeats the process until all frames are designated. Once all frames are designated, the process ends 130 and the dither pattern array may be applied to an image.

Dither Pattern Analysis

Figure 8:
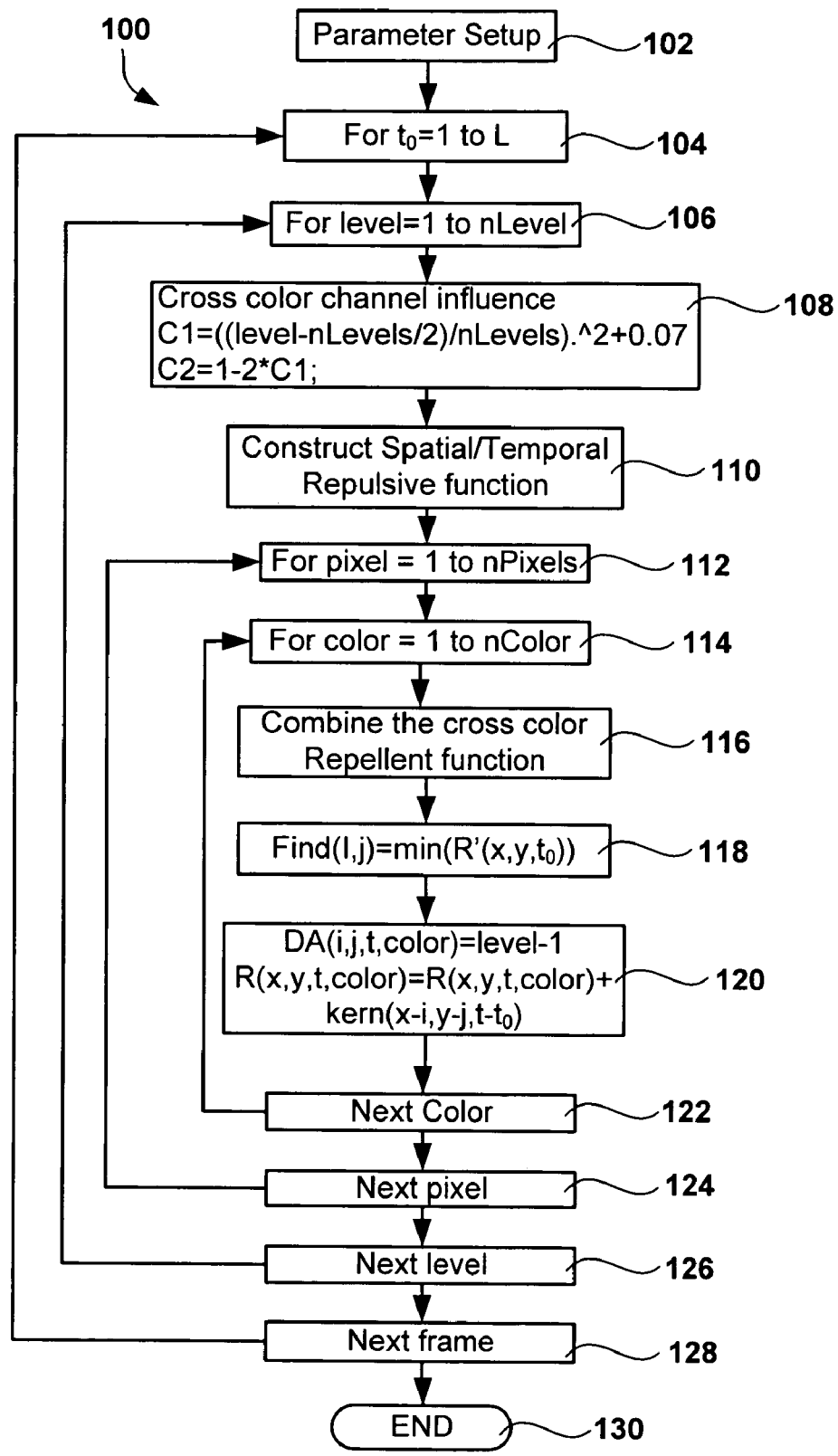
FIG. 8 is a flow chart illustrating the steps of dither structure creation employed in some embodiments of the present invention.

A dither pattern created with an embodiment of the present invention has been analyzed using Fourier analysis. The spatial/temporal power spectrum of the dither pattern is shown in FIG. 8. The dither pattern is high pass both spatially and temporally similar to the target spectrum.

It should be noted that in alternative embodiments, not illustrated in FIG. 8, dither pattern pixel values may be designated in other orders. As a non-limiting example, the pixel incrementing loop 112 may reside within the color channel selection loop 114 causing all pixels values for one level of a color channel to be designated before proceeding to the next color channel. Many other variations in these processes may also be implemented by one skilled in the art based on the information described herein.

Figure 1:
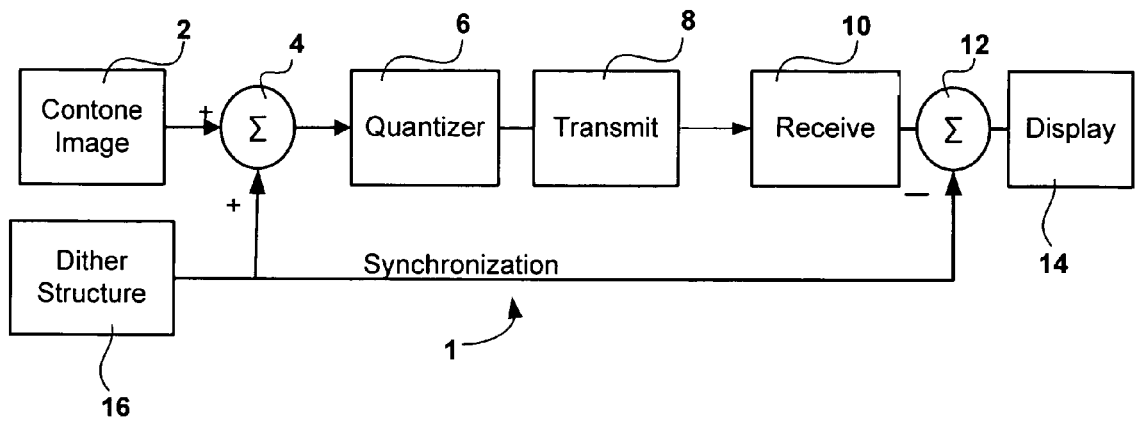
FIG. 1 illustrates an image display system.
Figure 2:
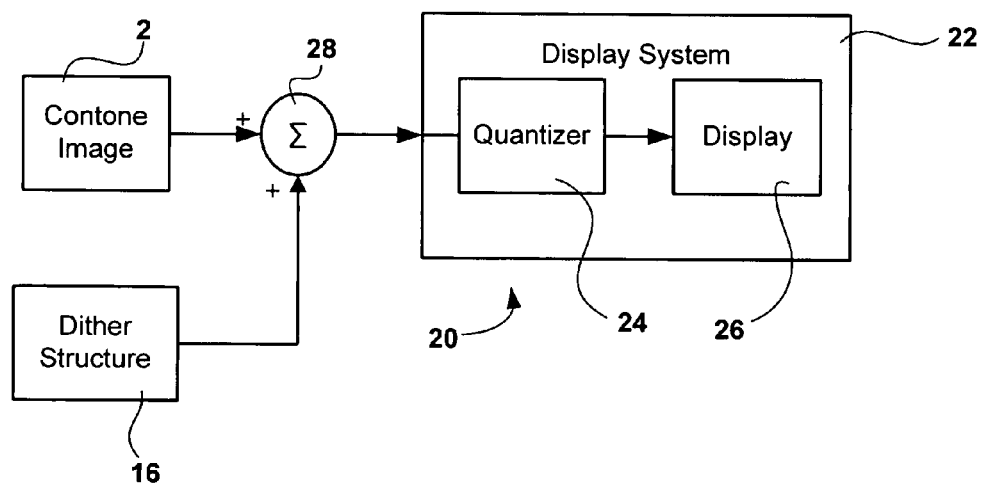
FIG. 2 illustrates another image display system.
Figure 3:
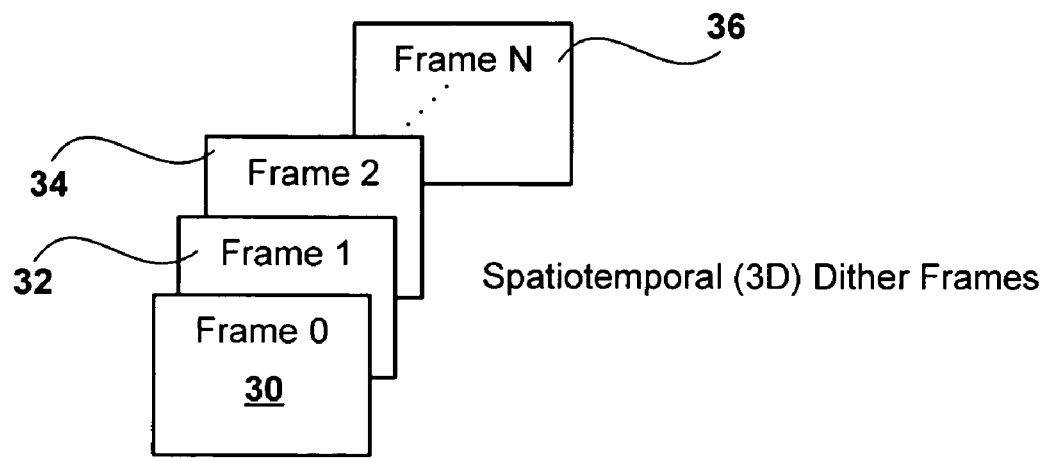
FIG. 3 illustrates a three-dimensional dither structure.
Figure 3:
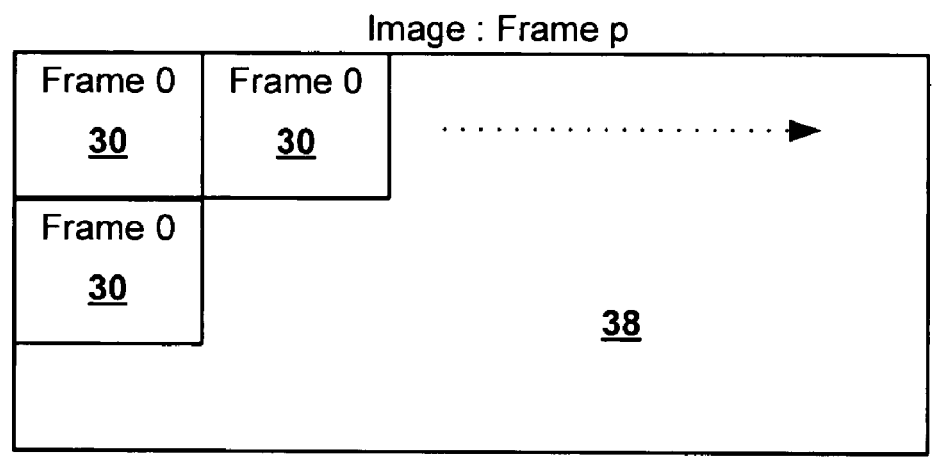
Figure 3:
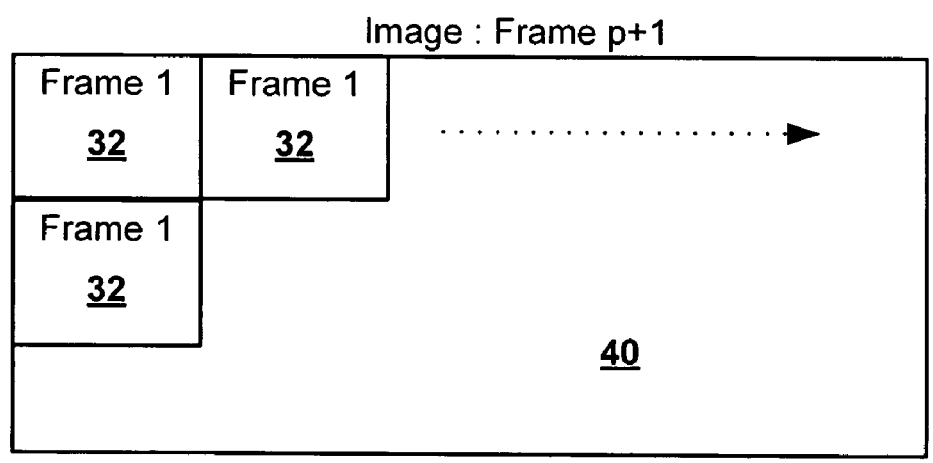
Figure 9:
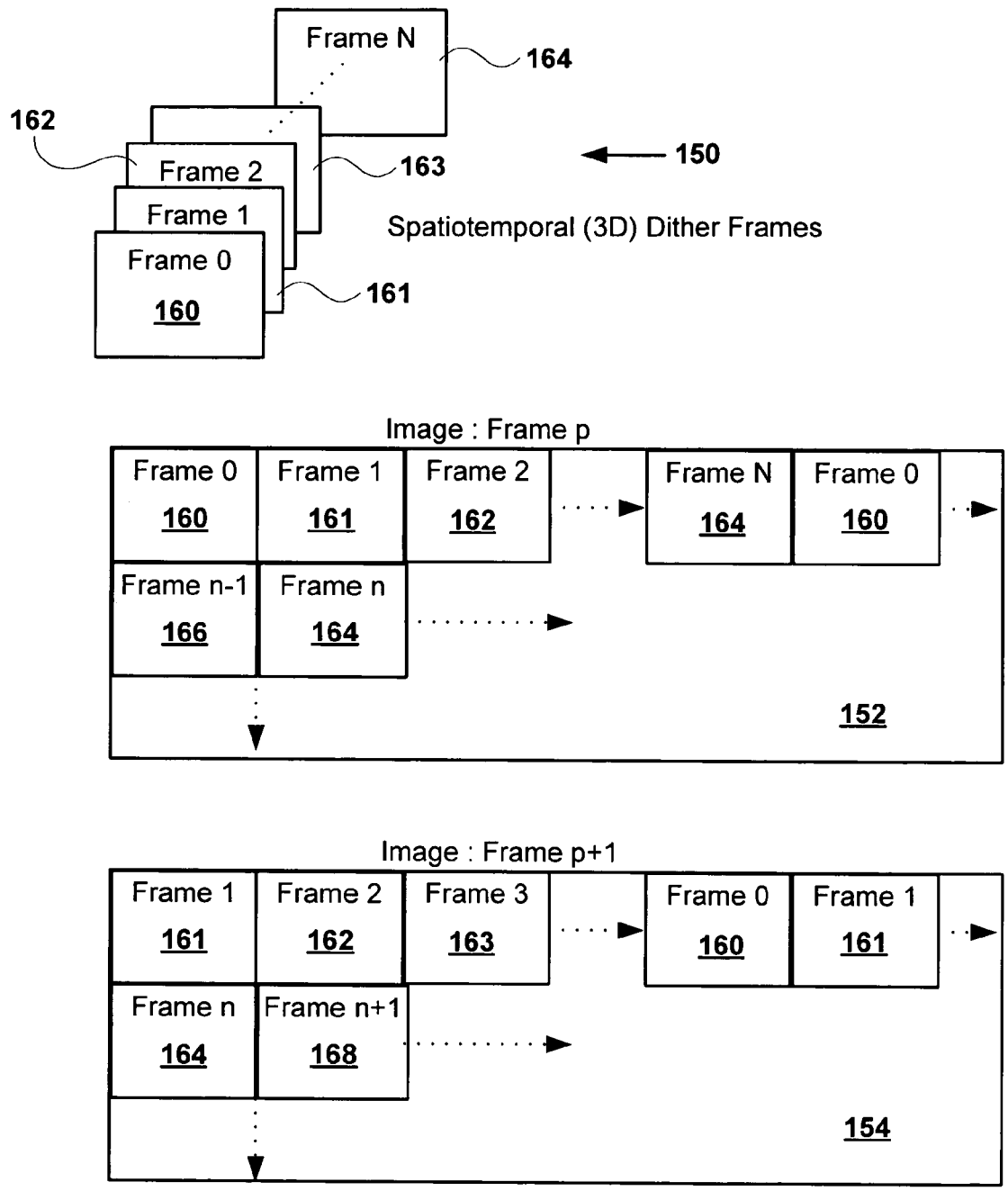
FIG. 9 illustrates a use of a dither pattern tile set wherein dither pattern tiles are arranged in a specific sequence.

Some embodiments of the present invention may also employ a tile stepping method as illustrated in FIG. 9 for further reduction of the possibility of visible artifacts. In these embodiments, a spatio-temporal array of dither pattern tiles 150 may be used. These dither pattern tiles 150 are typically smaller than the image to which they are applied in order to reduce memory size. The smaller tiles can cover the image in a tile pattern that uses the same tiles repeatedly. In some applications, the same tile is used repeatedly across the image as shown in FIG. 3. However, this method can result in visible artifacts caused by the repeated pattern. This problem may be reduced or eliminated by using tiles from multiple successive frames. This method can be employed in the spatial and temporal dimensions. As shown in FIG. 9, tiles can be incremented spatially across an image 152 starting with a first tile frame 160 and then using each successive tile frame 161, 162 & 164 to fill out the tile pattern across the image 152. This pattern of successive tile frames can be employed in the temporal direction as well. In the next successive image frame 154, the tile frame succeeding the tile frame used in the prior image frame at any given tile location is used. For example, when a first tile frame 160 is used in the top left position in a first image frame 152, the next successive tile frame 161 is used at that location in the next image frame 154. Similarly, the second tile position in the first frame 152 is occupied by the second tile frame 161 and that position in the second image frame 154 is occupied by the third tile frame 162. The same pattern is repeated for each tile position and each image frame. Once the number of tile frames is exhausted, the tile set order is repeated.

Figure 10:
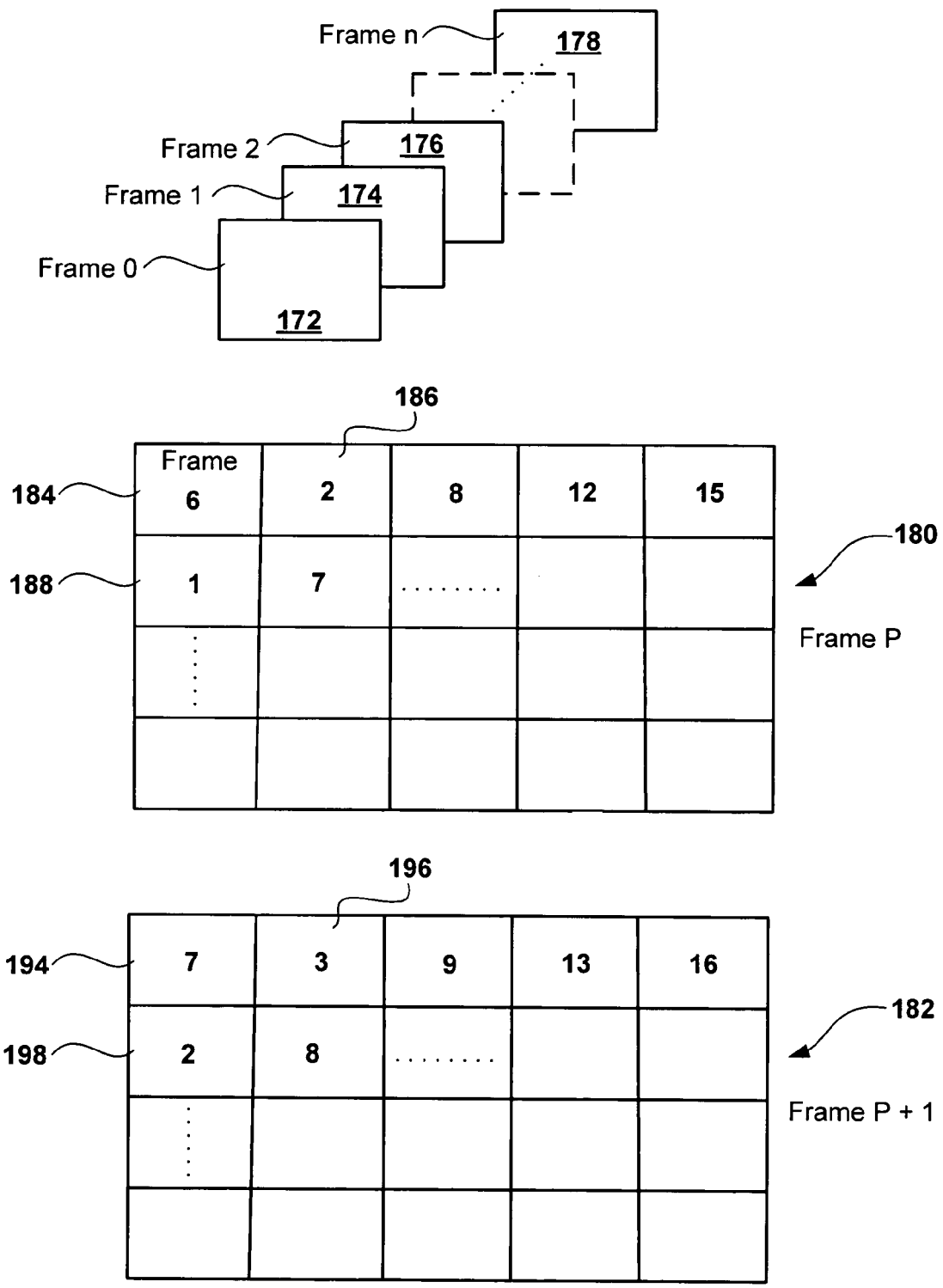
FIG. 10 illustrates another use of a dither pattern tile set wherein tiles are put in a random spatial pattern, but used sequentially in the temporal dimension.

In other embodiments of the present invention, the tile pattern in a particular frame may be varied beyond a sequential spatial order across the rows. In some embodiments, the tiles may be dispersed in a random spatial order across a frame. Once this random spatial pattern is established in the first frame, the tiles in the next temporal frame and subsequent frames will follow a sequential temporal order such that the tile corresponding to the position of a tile in the first frame will be the next sequential tile in the temporal order established in the dither tile structure. These embodiments are illustrated in FIG. 10 where a dither tile set 170 is established with tile frames 0 through 3 (172-178) shown in sequential temporal order. Tile set 170 will typically comprise many other frames as well, but the quantity illustrated is limited to 4 for simplicity of explanation. In a first image frame 180, tiles 172-178 and other tiles in a set are dispersed randomly across the frame 180. In the next image frame, p+1 (182), the tile used at any particular location is the next tile in temporal order from the tile used at that location in the previous frame. For example, at the top left tile location 184 in frame "p" 180, dither tile 6 is used as randomly placed. For the tile at that location 194 in frame "p+1" 182, the next tile in temporal order established in the dither tile structure 170, frame 7, is used. Likewise, for the second tile in the first row 186 of frame "p"180, tile 2 is used and the nex tile, tile 3 is used for that location 196 in frame "p+1" 182. Of course, other non-random and pseudo-ramdom patterns may be employed as well.

The terms and expressions employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

We claim:

1. A method for creating an additive image dither pattern array for addition to an image in a video sequence to reduce artifacts, said method comprising:
   a. assigning a value to pixels in an additive image dither pattern away tile such that each consecutively-assigned pixel value is placed at a location that is dispersed from previously-placed pixel values that are located in other color channels and other temporal frames of said video sequence, wherein said location is determined with a combined, cross-color-channel, spatio-temporal repellent function.

2. A method according to claim 1 wherein said dispersion from previously-placed pixel values in said other color channels is weighted differently from dispersion from said previously-placed pixel values in said other temporal frames.

3. A method according to claim 1 wherein said dispersion from previously-placed pixel values in other color channels is weighted such that dispersion from previously-placed pixel values in a first color channel is weighted differently from dispersion from previously-placed pixel values in a second color channel.

4. A method for creating an additive image dither pattern for addition to an image in an image sequence with multiple image description channels for the purpose of artifact reduction, said method comprising:

assigning a value to pixels in an additive image dither pattern tile, wherein said assigning is performed using cross-channel influence and cross-temporal-frame influence, such that subsequently-assigned pixel values are placed at a location that is related to the location of previously-assigned pixel values in the same image description channel, to the location of previously-assigned pixel values in another image description channel and to the location of previously-assigned pixel values in another temporal frame.

5. A method according to claim 4 wherein said location is dispersed from the location of previously-assigned pixel values in the same image description channel, from the location of previously-assigned pixel values in another image description channel and from the location of previously-assigned pixel values in another temporal frame.

6. A method according to claim 4 wherein said location is dispersed from the location of previously-assigned pixel values in the same image description channel, from the location of previously-assigned pixel values in another image description channel and from the location of previously-assigned pixel values in another temporal frame using a combined repellent function comprising a spatial/temporal function and a cross-color-channel function.

7. A method according to claim 4 wherein said relation to the location of previously-designated pixels is channel specific such that pixel values in one color channel have a different relationship on said location than pixel values in another channel.

8. A method according to claim 4 wherein said relation to the location of previously-designated pixels is channel specific such that pixel values in color channels other than the channel of the pixel being designated have a different relationship on said location than pixel values in the same channel.

9. A method according to claim 4 wherein said image description channels are color channels.

10. A method according to claim 4 wherein said image description channels comprise three channels for each of a red, green and blue color.

11. A method according to claim 4 wherein pixel values in said channels are assigned in parallel with cross-channel dispersion influence for each channel.

12. A method for creating a spatio-temporal array of additive image dither patterns for use in reducing contouring artifacts in images, said method comprising:

a. establishing a spatio-temporal away of additive image dither pattern tiles comprising a plurality of temporal framesets, each of said framesets comprising a plurality of pattern tiles for each of a plurality of color channels; and b. designating pixel values in said additive image dither pattern tiles wherein subsequently-designated pixel values are dispersed, by a spatial/temporal/color-channel repellent function, from previously-designated pixel values in the same dither pattern tile, previously designated pixel values in dither pattern tiles at corresponding locations in other color channels and dither pattern tiles at corresponding locations in other temporal frames wherein said designating produces an additive image dither pattern away that is spatially-high-pass within said tiles, high-pass relative to co-located color channel tiles and high-pass in relation to co-located tiles in adjacent temporal frames.

13. A method according to claim 12 wherein said dispersion from pixel values in other temporal frames is weighted wherein temporal frames more temporally distant from a to-be-designated pixel value have a lower dispersion than closer temporal frames.

14. A method according to claim 12 wherein said dispersion from pixel values in other color channels is weighted wherein other color channels have a lower dispersion than the color channel in which a pixel value is being designated.

15. A method according to claim 12 wherein pixel values designated in a last temporal frame are considered temporally adjacent to a first-designated frame wherein said pixel values in said first-designated frame have a dispersion effect on pixels designated in said last frame.

16. A system for creating a spatio-temporal array of additive image dither patterns, said method comprising:

a. a spatio-temporal away of additive image dither pattern tiles comprising a plurality of temporal framesets, each of said framesets comprising a plurality of pattern tiles for each of a plurality of color channels; and b. a designator for designating pixel values in said dither pattern tiles wherein subsequently-designated pixel values are spatially dispersed from previously-designated pixel values in the same dither pattern tile dither pattern tiles in other color channels, and dither pattern tiles in other temporal frames.

17. A method for creating a spatio-temporal away of additive image dither patterns, said method comprising:

a. establishing a first temporal frameset comprising dither pattern tiles for each of a plurality of color channels;

b. selecting a first pixel value level for subsequent pixel value designation;

c. establishing a pixel quantity;

d. selecting a color channel for pixel value designation;

e. calculating the location of an extreme value of a combined cross-color-channel and spatial/temporal repellent function that is influenced by the presence of designated pixels in said selected color channel, another color channel and another temporal frame;

f. designating a pixel value corresponding to said first pixel value level at said location;

g. updating said combined function to account for the presence of said newly designated pixel value;

h. selecting a new color channel i. repeating steps e through h until a pixel value has been designated in all color channels;

j. incrementing a pixel counter value;

k. repeating steps e through j until said pixel counter value equals said pixel quantity;

l. selecting a new pixel value level;

m. repeating steps b through l until all levels have been designated;

n. advancing to the next temporal frame; and o. repeating steps b through n until all temporal frames have been designated.

* * * * *